Figure 1:
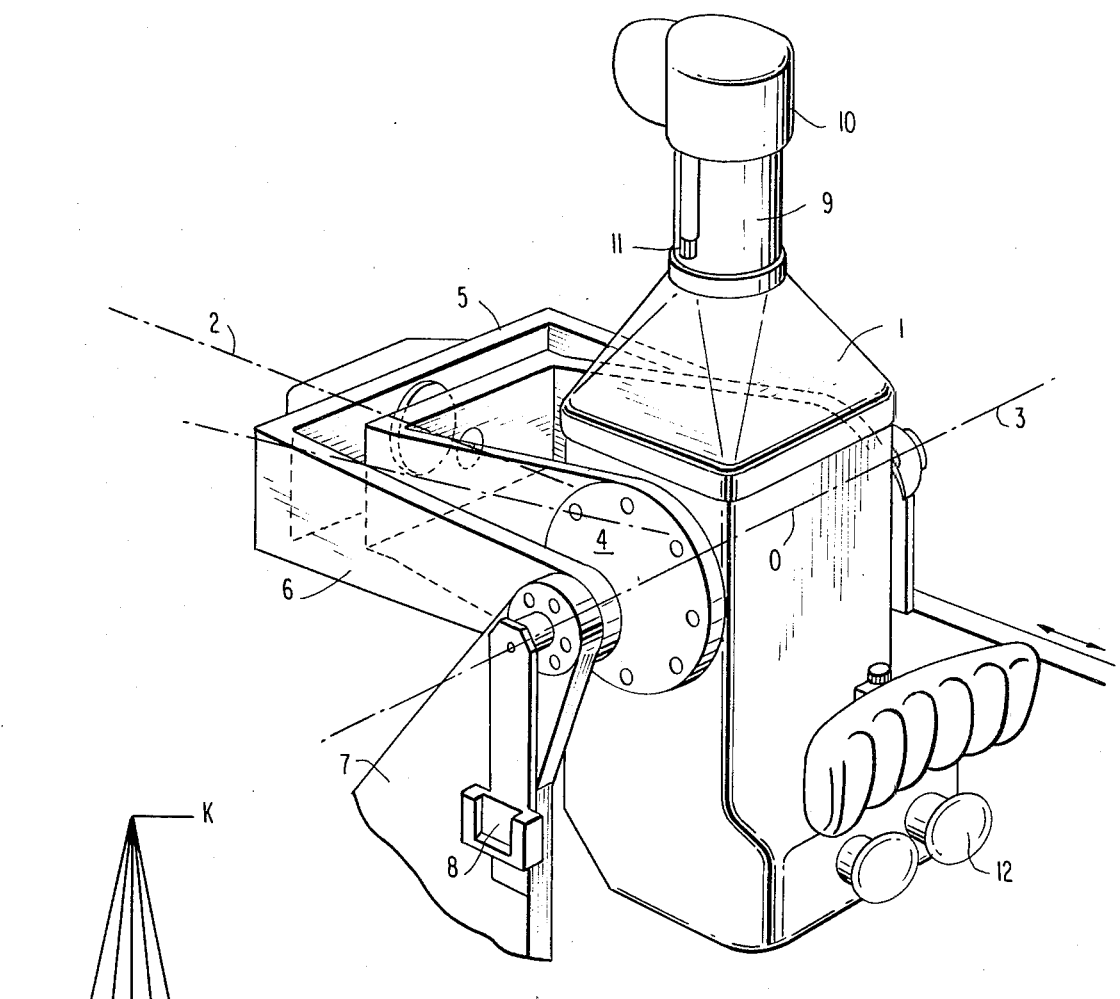

United States Patent [19]

Teiling

[11] 4,356,758
[45] Nov. 2, 1982

[54] AIMING INSTRUMENT

[75] Inventor: Torbern Teiling, Lidingö, Sweden

[73] Assignee: Aktiebolaget Bofors, Bofors, Sweden

[21] Appl. No.: 158,028

[22] Filed: Jun. 9, 1980

[30] Foreign Application Priority Data

Jun. 14, 1979 [SE] Sweden .............................. 7905245

[51] Int. Cl.³ .............................................. F41G 3/06
[52] U.S. Cl. .................................... 89/41 E; 89/41 T; 89/37 G
[58] Field of Search ................ 89/41 E, 41 CE, 41 T, 89/37 G

[56] References Cited

U.S. PATENT DOCUMENTS

| | | | |
|---|---|---|---|
| 1,551,386 | 8/1925 | Greene et al. | 89/41 E |
| 2,892,384 | 6/1959 | Kelly | 89/41 T |
| 3,677,134 | 7/1972 | Maximi et al. | 89/41 E |
| 3,888,563 | 6/1975 | Dierkes | 89/41 E |
| 4,062,267 | 12/1977 | Vinches et al. | 89/41 E |
| 4,173,414 | 11/1979 | Vauchy et al. | 89/41 L |

FOREIGN PATENT DOCUMENTS

PCT/FR78/-
00009 7/1978 France .............................. 89/37 G

Primary Examiner—Sal Cangialosi
Attorney, Agent, or Firm—Pollock, Vande Sande & Priddy

[57] ABSTRACT

Apparatus for aiming a gun barrel in a specific direction. A panoramic optical aiming system is provided which includes image reversion optics for compensating for image rolling. Additional control of the reversion optics is provided for compensating for ground inclination. A calculating unit may be employed to control the optical aiming system in response to various sensed conditions.

5 Claims, 4 Drawing Figures

AIMING INSTRUMENT

The present invention relates to an automatic aiming instrument for a gun, more particularly a field artillery gun, such as a howitzer, for aiming the gun barrel of the weapon in a specific direction in azimuth, i.e. in the horizontal plane, as well as in elevation, i.e. in the vertical plane.

For artillery guns of this type the gun barrel is generally directed with respect to the upper and lower carriages by rotation about two perpendicular axis, i.e. one axis for moving in traverse (azimuth) and one axis for moving in elevation. It is typical of a gun which is placed in position for firing that its axes form an angle with the horizontal plane. As a consequence, rotation about the vertical axis the direction of the gun barrel in azimuth as well as in elevation. In the same way a change in elevation by rotation about the horizontal axis means that the direction of the gun barrel is changed not only in elevation but also in azimuth.

In order to facilitate aiming of the weapon towards a specific point the weapon is provided with an aiming instrument, or sight, in which the aiming movement can be observed. The instrument comprises a telescope which can be moved to some extent relative to the gun barrel. To determine a specific azimuth angle for the weapon a reference in azimuth is required. Such reference is usually indicated in the landscape by means of one or more vertical reference objects such as vertical aiming posts, vertical aiming marks on a symbol plate image projected by a collimator etc. Such reference objects cannot, however, be located so remote from the weapon that parallax errors, which arise when the weapon is moved, for instance when firing, can be neglected. The consideration of parallax errors will be described in detail in connection with FIG. 2 below.

When a collimator is used as a reference object it is necessary to place the principal axis of the existing weapon sight in parallel with the collimator axis. Aiming of the weapon in azimuth is performed, in the most simple case when the weapon is levelled, by introducing a difference angle defined by the actual azimuth angle and the collimator axis. The position of the sight is then changed a corresponding difference angle with respect to the gun barrel (upper carriage) and then affixed. The upper carriage is then traversed with respect to the ground (lower carriage) until the sighting line of the telescope and the sighting mark of the collimator coincide. In this way the gun barrel will have a correct azimuth or bearing angle. Aiming of the weapon in elevation can then be performed in a conventional way by means of a quadrant level.

The aiming instrument may preferably consist of a so-called panoramic sight or telescope, which basically comprises a top prism rotatable above a vertical axis and a fixed ocular and objective. A reversion prism is disposed between the top prism and the objective to compensate for rolling of the image due to rotation of the top prism. In the most general case when the weapon has not been levelled, i.e. not horizontally arranged, it is previously known to use aiming instruments in which the telescope is mounted on a platform which is cardanic suspended. The platform is levelled by means of a liquid level or the like. When traversing a weapon having an aiming instrument of this type the ground inclination changes and the platform must be relevelled. The level of the platform is also changed when the gun barrel is elevated. The leveling operation can be performed entirely by hand, which is very time-consuming, however, as four angles have to be adjusted repeatedly until the angles have converged into the desired result.

It is also previously known to perform the platform levelling completely automatically. A disadvantage with this instrument, however, is that the existing coupling between the traversing and elevating movements cannot generally be eliminated.

It is therefore, an object of the present invention to provide an aiming instrument in which the ground inclination can be compensated for in a simple way without any time consuming adjustments. The aiming device according to the present invention is mainly characterized by the fact that the existing image reversion optics is used for compensating the ground inclination in addition to its conventional use for compensating the rolling of the image due to rotation of the top prism.

The image reversion optics preferably comprises an image reversion prism which is arranged to rotate with a speed corresponding to half the rotational angular speed in traverse for compensating for image rolling. To compensate for the ground inclination the prism is rotated another angle in addition to said angle corresponding to half the side-angle.

Figure 2:
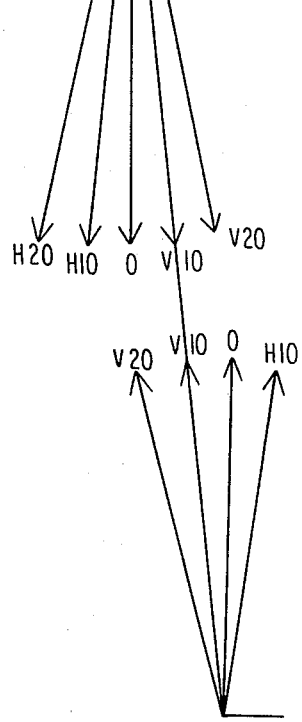
Figure 3:
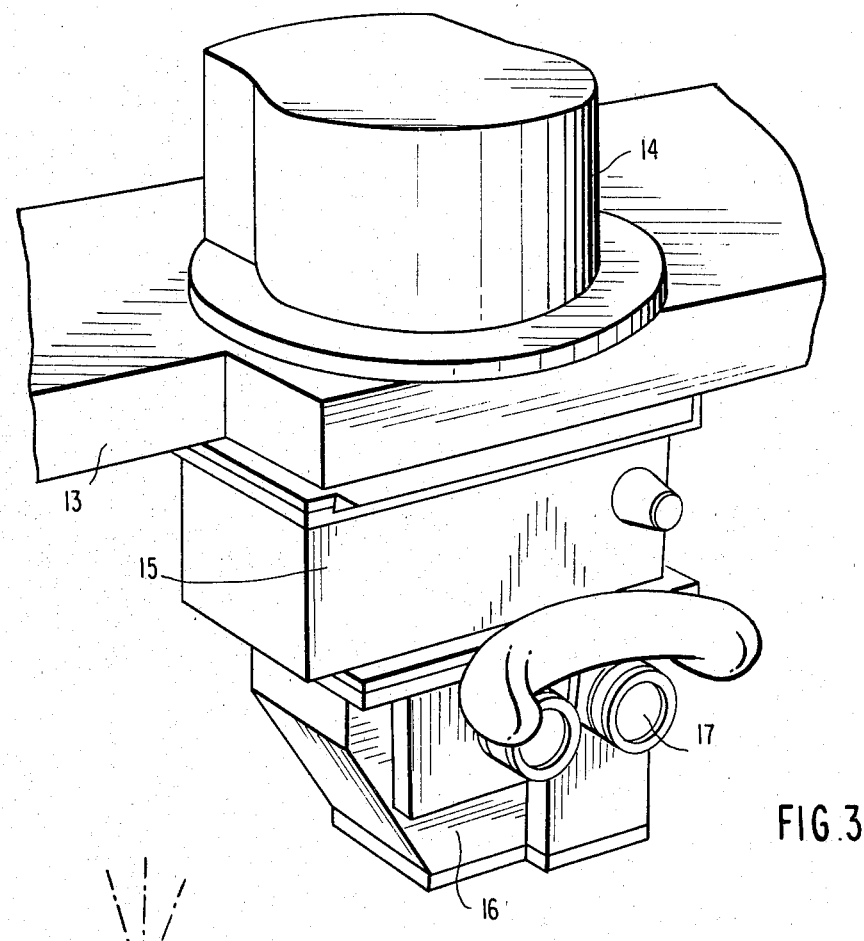
Figure 4:
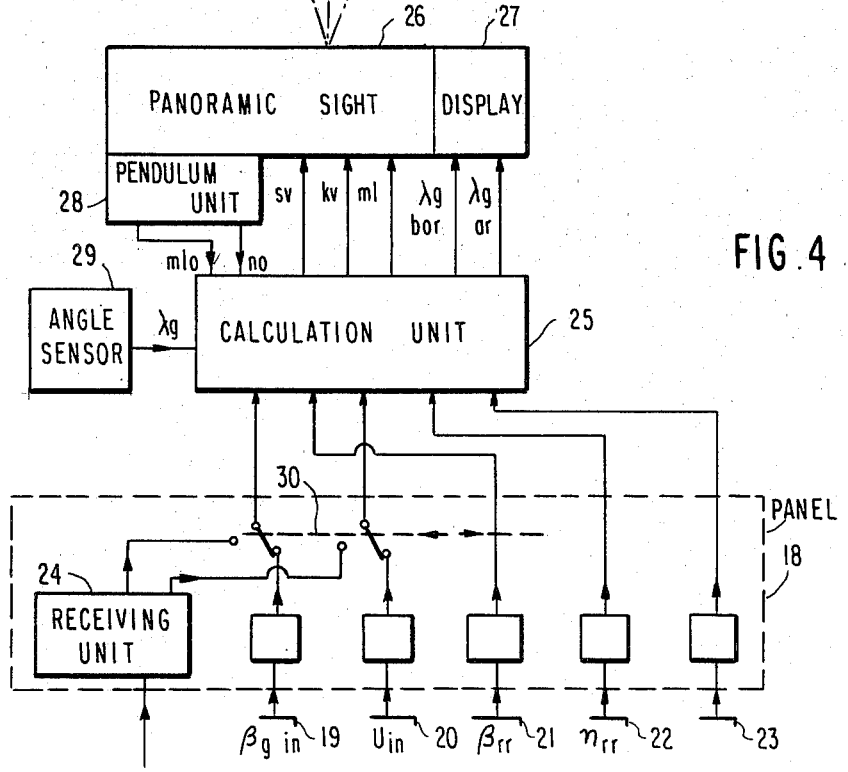

A preferred embodiment of our invention will now be described with reference to the accompanying drawings in which FIG. 1 shows an automatic aiming instrument of the panoramic type, FIG. 2 shows how parallax errors can be eliminated when a collimator is used as a reference object, FIG. 3 shows the design of an aiming instrument according to the invention and FIG. 4 is a block diagram of the aiming instrument and related system components.

FIG. 1 shows an automatic aiming instrument of the panoramic type which comprises a cardanic suspended platform with an instrument housing 1 which is rotatably mounted about an outer cardan shaft (roll axis) 2, which is parallel to the bore axis of the weapon, and an inner cardan shaft (pitch axis) 3, which is perpendicular to the outer cardan shaft, i.e. parallel to the horizontal axis. The cardan joint of the instrument has been designated by the reference O in the figure.

The instrument housing 1 is connected to a roll frame member 4 rotatably mounted on an elevational frame member 5 having two yokes 6 which are rotatably mounted in a support 7. The support 7 further comprises a mounting member 8 for connecting a sight.

The upper part of the instrument comprises an elongated tubular shaft 9 which extends upwardly, periscopically, through the instrument housing 1 and which carries a top prism 10. The tubular shaft 4 with the top prism 10 is rotatably mounted about the vertical axis of the instrument for adjusting the azimuth (bearing) angle. The top prism is also rotatably mounted about an horizontal axis by means of a screw 11.

In addition to the top prism 10 the instrument comprises the usual main components such as an objective, a prism, an aiming or symbol plate and an ocular 12. Said components are conventional and will not be described in any detail.

In order to compensate for the image rolling due to the turning of the top prism in azimuth the sighting instrument further comprises image reversion optics, usually a reversion prism, dove or peschan prism, which is brought into rotation with a speed corresponding to half the rate of turn in azimuth. Even such optical components are previously known and have therefore not been illustrated in the figure.

When using an aiming instrument of this type it is, as already mentioned, necessary to notice the parallax error which arises when determining the reference direction in azimuth and also to compensate for ground inclination.

In FIG. 2 it is illustrated how parallax errors can be eliminated when using an artillery collimator as a reference object. The collimator, or its projector, forms an image of a horizontal aiming plate which bears vertical markings, some of the markings provided with identification numerals in a conventional way. The existing sighting device on the weapon is located on point S in the figure and the collimator on point K. The principal axis of the sighting device must be brought into parallelism with the collimator axis. This can be done in such a way that the weapon operator when aiming makes sure that markings bearing the same identifications move into coincidence, for instance that the image of the marking V 10, i.e. left ten mrad, move into coincidence with the marking V 10 in the telescope. This means that parallelism of the axes has been established.

In order to compensate for ground inclination in conventional aiming instruments, the instrument housing is first adjusted horizontally by means of a liquid level or the like. The turning of the instrument housing about the inner cardan shaft then corresponds to the true elevation of the gun barrel while its turning about the outer cardan shaft corresponds to the existing ground inclination in the actual aiming direction.

The line of sight of the telescope can be traversed which is also in azimuth as the instrument housing is levelled. The magnitude of this turning must be the actual angle in azimuth reduced by the azimuth reference. The telescope setting in elevation shall compensate only for parallax between the aiming reference and weapon in elevation. When a weapon having an instrument of this type is aimed in azimuth, the ground inclination is changed and the platform must be relevelled. The horizontal position is also changed when the barrel is elevated. Performed by hand such an operation consists of successive adjustments of four angles until the angles have moved into the desired values.

Even if the levelling of the platform can be performed automatically the existing coupling between the aiming in azimuth and elevation has not generally been eliminated. In order to overcome this problem the panoramic sight according to FIG. 1 has been modified so that the image reversion prism can be turned by servo means another angle in addition to the angle corresponding to half the side angle. By having this additional angle to correspond with the ground inclination taken along the line of sight, then it is possible to compensate for the ground inclination in a simple way in an instrument of the panoramic type with its side axis parallel to the side axis of the weapon and an elevation axis perpendicular thereto. Both the upper part of the sight and its top prism are servo controlled so that the line of sight can be controlled within ±180° in azimuth and an appropriate interval, for instance ±10°, in elevation.

FIG. 3 shows a design of a new embodiment of the aiming instrument which is affixed to a base 13 so that its side axis is parallel to the side axis of the weapon and with its elevation axis perpendicular thereto. The instrument comprises a rotatable outer upper part 14 and a sight housing 15 including the image reversion optics and servo means. The telescope 16 is located under the image reversion optics. The instrument further comprises a display unit and an ocular 17 in which the operator views the target area.

In FIG. 4 a block diagram of the aiming instrument and its related components is illustrated. When describing the figure the following designations have been used.

$\beta g$—gun azimuth, predicted or instantaneous
U—gun elevation, predicted or instantaneous
Sv—the side angle of the upper part of the sight
hv—line of sight elevation with respect to the sight
$\beta rr$—azimuthal reference
mlo—ground inclination for the line of sight (roll) for zero settings in azimuth and elevation with respect to the upper carriage of the weapon
no—pitch angle for the line of sight for zero settings in azimuth and elevation
ml and n—as mentioned above but for arbitrary sv and hv values
nrr—pitch angle for the aiming reference
$\lambda g$—gun barrel elevation with respect to the upper carriage The system consists of the following main parts. A panel 18 with means 19-22 for adjusting $\beta g$ in, U in, $\beta rr$ and nrr as well as mode of function 23 and with a unit 24 for receiving data information from a central processing unit or the like. The panel is connected to a calculation unit 25 for evaluating the necessary calculations. The calculating unit 25 is connected to a panoramic sight 26 as already described which comprises servo means for controlling the movement in azimuth and elevation, a servo controlled image correcting device and a display unit 27.

On the lower part of the sight a pendulum unit 28 is arranged for measuring the ground inclination of the line of sight as well as its pitch angle (mlo and no, respectively) which signals are fed to the calculating unit. To the calculating unit it is also connected an angle sensor 29 for determining the instantaneous elevation of the gun barrel with respect to the upper carriage.

The operation of the system may be summarized as follows. It is presumed that the weapon is controlled in its own angles, i.e. $\beta g$ and $\lambda g$, and that the switch 23 for mode of functions is set on normal function. The desired azimuth ($\beta g$) and elevation ($\lambda g$) can be transmitted from the central processing unit directly via the receiver 24 to the calculating unit 25. Alternatively the information can be telephoned to the operator in which case the calculating unit via a switching member 30 is connected to means 19, 20 for manually adjusting the desired azimuth and elevation ($\beta g$ in and U in, respectively). Then the azimuthal reference ($\beta rr$) and the pitch angle for the aiming reference are set by means of the switches 21 and 22, respectively.

By means of said values a calculation of the necessary azimuth and elevation (sv and hv, respectively) and the angle ml can be performed, which values are transferred to the sight 26 and set automatically by means of the sight servos.

Then the operator aims the weapon in azimuth in a conventional way, so that the aiming reference is observed within the field of view of the sight. Then the pitch angle (nrr) is adjusted. The system then calculates the angles sv, hv and ml continuously. The operator controls the weapon in elevation so that the conditions mentioned in the introductory part are met when compared with an aiming plate and an projector image. The operator observes in the display unit the desired value and the instantaneous value of the elevation (λg) of the gun barrel with respect to the upper carriage. The weapon is then elevated until its instantaneous value coincides with the desired value and finally the settings are checked.

I claim:

1. An automatic instrument for aiming a gun barrel in a specific direction in elevation and azimuth comprising:

an optical sight including a top prism rotatable about a vertical axis, a reversion prism and objective lens, said reversion prism being rotatable for compensating rolling of an image due to rotation of said top prism; said optical sight positionable in azimuth and elevation through a first servo control means;

second servo control means for controlling said optics for rotating said reversion prism whereby ground inclination is compensated;

a pendulum unit for providing signal proportional to the inclination of the line of sight and pitch angle of said line of sight;

an angle sensor for providing a signal indicating the elevation of said gun barrel;

calculating unit connected to receive said signals;

means for applying an azimmuthal reference and pitch angle to said calculating unit; and means connected to said calculating unit for providing azimuth and elevation angles to said optical sight for controlling the position of said sight, and for supplying signals to said servo control means whereby ground inclination is compensated.

2. An instrument according to claim 1 wherein said image reversion prism rotates at a speed corresponding to half the rate of rotation in azimuth for compensating the image rolling rotates another angle, in addition to the angle corresponding to half the side angle, for compensating for ground inclination.

3. An instrument according to claim 2 wherein said pendulum unit is provided for measuring the ground inclination of the line of sight (Mlo) as well as its pitch angle ($n_o$) which provides signals to a calculating unit for determining the required angle in azimuth (sv) and elevation (hv), and the ground inclination (ml), which values are fed to the instrument for automatically setting by servo means said aiming instrument.

4. An instrument according to claim 3 wherein the calculating unit is connected to a panel having switching means for setting the desired azimuth and elevation, the azimuthal reference and the pitch angle for an aiming reference and also the mode of function of said aiming instrument.

5. An instrument according to claim 4 wherein the panel comprises means for transmitting the desired azimuth $\beta g$ and elevation $\lambda g$ directly from a central instrument to the calculating unit or means for manually adjusting said azimuth and elevation.

* * * * *